United States Patent [19]

Oh

[11] 4,428,760
[45] Jan. 31, 1984

[54] OXYHYDROGEN FLAME TORCH FOR OPTICAL FIBER DRAWING

[75] Inventor: Shin M. Oh, Roanoke, Va.

[73] Assignee: International Telephone and Telegraph Corporation, New York, N.Y.

[21] Appl. No.: 361,659

[22] Filed: Mar. 25, 1982

[51] Int. Cl.³ .......................................... C03B 37/025
[52] U.S. Cl. ............................................. 65/2; 65/12; 65/13; 65/32; 65/157
[58] Field of Search ....................... 65/2, 3.11, 12, 13, 65/18.2, 32, 157

[56] References Cited

U.S. PATENT DOCUMENTS

| 3,125,428 | 3/1964 | Maczka | 65/13 |
| 3,652,248 | 3/1972 | Loxley et al. | 65/12 X |
| 3,890,127 | 6/1975 | Siegmund | 65/13 X |
| 4,224,046 | 9/1980 | Izawa et al. | 65/2 X |
| 4,336,049 | 6/1982 | Takahashi et al. | 65/18.2 X |
| 4,383,843 | 5/1983 | Iyengar | 65/2 |

Primary Examiner—Richard V. Fisher
Attorney, Agent, or Firm—John T. O'Halloran; Peter R. Ruzek

[57] ABSTRACT

An oxyhydrogen torch for use in drawing an optical fiber from a preform without axial rotation includes four coaxial tubular elements bounding respective passages. The fiber is coaxially drawn through the innermost passage, and hydrogen, oxygen and an inert gas are respectively individually admitted into the successively outer passages at their upstream ends in the circumferential directions of the respective passages. Oxygen and hydrogen become mixed with one another and combust after leaving the downstream ends of the respective passages to form an annular oxyhydrogen flame in a heating zone of the torch around the portion of the preform from which the fiber is being drawn. The inert gas, such as argon or nitrogen, flows past the flame in the heating zone to shield the flame from environmental disturbances. The outermost tubular element has an extension which surrounds the heating zone and confines the stream of the shielding inert gas to provide an improved shielding effect for the flame, while being cooled by the shielding gas.

9 Claims, 2 Drawing Figures

OXYHYDROGEN FLAME TORCH FOR OPTICAL FIBER DRAWING

BACKGROUND OF THE INVENTION

This invention relates to improvements in optical fiber manufacture. More specifically, the invention relates to a method and apparatus for providing improved fiber drawing from an optical preform.

In the drawing of optical fibers from an optical preform, it is necessary to heat a portion of the preform to its "drawing temperature." A filament of glass is pulled from the heated portion of the preform to form an optical fiber. It is possible to give the fiber the desired light transmitting properties by carefully regulating the diameter of the fiber drawn from the preform. In order to provide an optical fiber having uniform light transmission characteristics along its length, it is imperative that the diameter of the fiber be maintained constant along the length of the fiber. Additional factors such as the fiber drawing temperature and tension, the rate of drawing and the protection of the drawn fiber, all affect the optical characteristics of the drawn fiber.

The fiber drawing tension significantly affects the optical transmission properties of the final glass fiber. Since drawing temperature affects both optical and mechanical properties of the drawn fiber, optimum drawing temperature must be employed to obtain a fiber having the desired properties. The drawing temperature is associated with other fiber drawing parameters, such as drawing speed, preform and fiber diameter, and preform feed speed. Therefore, fiber drawing tension, which is mainly dependent on the drawing temperature, should be carefully controlled.

Very low loss optical fibers can be drawn at a drawing tension approaching 50 grams. On the other hand, low drawing tension, for instance of less than 5 grams, may be maintained during drawing of long lengths of high strength fiber. The low drawing tension is achieved by utilizing a high drawing temperature. However, high drawing temperature causes a high degree of silica vaporization. The upper limit of the drawing temperature with regard to optimum drawing tension depends on drawing conditions. The quality of the drawn fiber, that is, its mechanical and optical properties, will also be dependent on the degree of contamination of the material of the fiber. Therefore, it is imperative that the fiber be manufactured under conditions which avoid, to the largest possible or feasible extent, introduction of impurities into the material or the fiber. Moreover, the surface of the drawn fiber should be as perfectly smooth as possible since any irregularities or defects in such surface adversefly affect the optomechanical properties of such fiber and especially degrade the strength of the fiber.

Therefore, it is customary to use preforms which contain a minimum amount of impurities, if any, and to conduct the fiber drawing operation in an environment which is free of dust and other contaminants. Yet, such contaminants may be introduced into the material of the preform or of the fiber by the heat source which heats the portion of the preform from which the fiber is being drawn. Therefore, it is desirable to use a relatively "clean" heat source, that is, a heat source which will not introduce any significant amount of contaminants into the material of the preform of fiber.

A relatively clean economical heat source is an oxyhydrogen torch which produces a flame as a result of combustion of purified hydrogen with purified oxygen. However, experience with conventional heat sources of this type has shown that the oxyhydrogen flame produced by the same is subject to flucuations and that, consequently, the heat flux into the preform is irregular. This, in turn, means that the visosity of material of the portion of the preform from which the fiber is being drawn varies from point to point with attendant variations in the flow rates of the material at such points and, consequently, in relatively poor control of fiber dimensions.

This problem is ameliorated when, in accordance with conventional techniques, at least two oxyhydrogen torches are so arranged around the axis of the preform and of the fiber that their flames are aimed substantially radially against the portion of the preform from which the fiber is being drawn, and when relative angular displacement about the aforementioned axis is effected between the preform/fiber combination and the oxyhydrogen torches, especially when the combination is rotated about its longitudinal axis. However, even in such a construction, the above-discussed problem of the flame fluctuations and their effect on the quality of the drawn fiber is not completely eliminated.

SUMMARY OF THE INVENTION

Accordingly, it is a general object of the present invention to avoid the disadvantages of the prior art.

More particularly, it is an object of the present invention to provide an oxyhydrogen torch for use in drawing an optical fiber from a preform, which does not possess the above-mentioned disadvantages of the conventional torches of this type.

Still another object of the present invention is to so construct the oxyhydrogen torch of the type here under consideration as to achieve uniform heating of the portion of the preform from which the fiber is drawn as considered in the circumferential direction of the preform.

It is yet another object of the invention to develop an oxyhydrogen torch of the above type which is simple in construction, inexpensive to manufacture, and reliable in operation nevertheless.

A concomitant object of the present invention is to devise a method of drawing fibers from preforms which results in a very high-quality drawn fiber of regular and unvarying cross section.

In pursuance of these objects and others which will become apparent hereafter, one feature of the present invention resides in an oxyhydrogen flame torch for use in heating a portion of a preform from which an optical fiber is drawn in a predetermined path, which comprises means for defining at least two passages extending along and centered on the path and one completely circumferentially surrounding the other, each of the passages having an upstream portion, and a downstream portion which opens into a heating zone receiving the portion of the preform to be heated during the operation of the torch, and means for introducing oxygen and hydrogen into the upstream portion respectively of a first and of a second of the passages for flow toward and beyond the respective downstream portion and for mixing with one another and combustion in the form of an annular flame in the heating zone.

Advantageously, the defining means further bounds an internal passage immediately surrounding the path and surrounded by the aforementioned other passage. It is further advantageous when the defining means further bounds an external passage surrounding the aforementioned one passage and when means is further provided for introducing a shielding gas into said external passage for flow through the latter toward and past the heating zone. The shielding gas advantageously is an inert gas especially argon or nitrogen.

It is especially advantageous when the defining means includes four tubular members, especially of fused quartz, coaxially consecutively surrounding one another. The inner three of the tubular members advantageously terminate at the heating zone while the outer of the tubular members extends beyond the inner tubular members in the downstream direction so as to surround at least a part of the heating zone and preferably extend beyond the latter. The introducing means is preferably so connected to the upstream portions of the passages that oxygen is introduced into the one and hydrogen into the other of said passages.

The present invention also relates to a method of heating a portion of a preform from which an optical fiber is drawn in a predetermined path, this method comprising the steps of conducting oxygen and hydrogen in separate annular flow paths respectively surrounding the predetermined path and one another to a heating zone which receives the portion of the preform to be heated during operation, and intimately mixing and combusting the oxygen and hydrogen with one another in the heating zone in the form of an annular flame. The method of the present invention may further include the step of shielding the flame, especially by an annular stream of inert gas, such as argon or nitrogen.

BRIEF DESCRIPTION OF THE DRAWING

Above-mentioned and other features and object of this invention will become more apparent by reference to the following description taken in conjunction with the accompanying drawings, in which.

DETAILED DESCRIPTION OF THE PREFERRED EMBODIMENT

Figure 1:
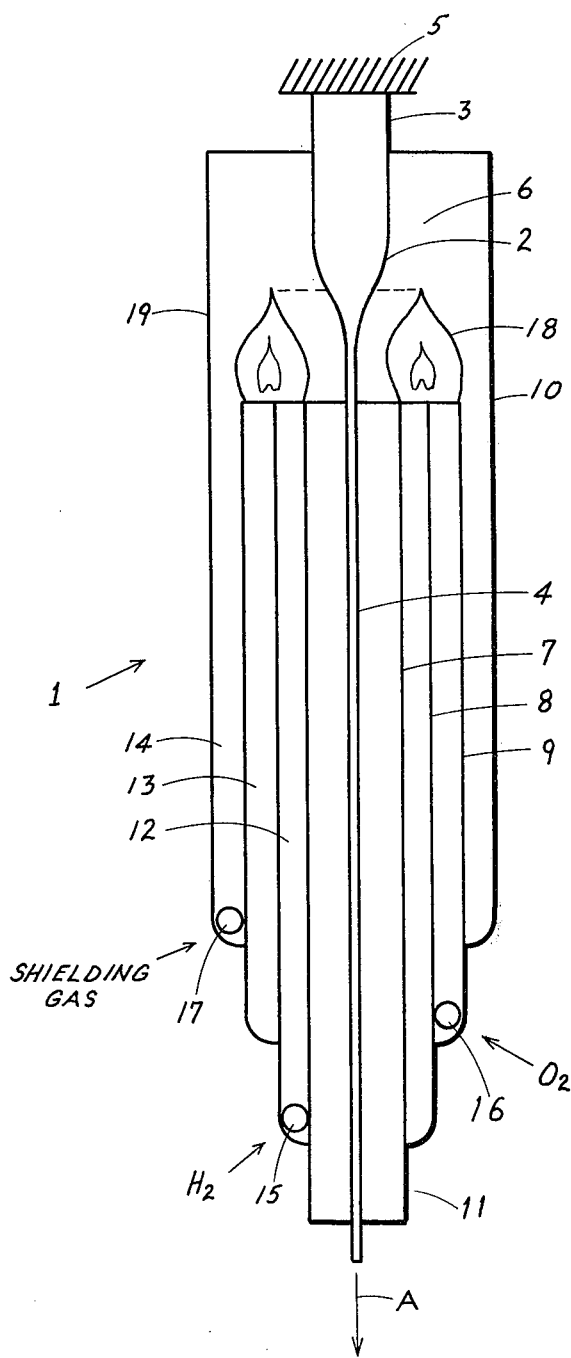
FIG. 1 is a axial sectional view of the oxyhydrogen flame torch of the present invention is use.

Referring now to the drawing in detail, and first to FIG. 1, it may be seen that the reference numeral 1 has been used to identify a torch or heating arrangement according to the present invention. The torch 1 is intended for use for heating a portion 2 of a preform 3, to a drawing temperature at which an optical fiber 4 can be drawn from the portion 2, as indicated by an arrow A. The drawing of the optical fiber 4 is accomplished in a well-known manner which does not form a part of the present invention, so that the arrangement capable of performing the drawing operation as such has not been illustrated in the drawing. However, according to the invention, the drawing arrangement will have to be so positioned relative to the torch 1 that the fiber 4 will move in a predetermined straight path centered on the axis of the torch 1 at least at the region of transition from the preform 2 into the fiber 4 and preferably all the way through the torch 1.

The torch 1 surrounds the fiber 4 being drawn and is centered on its own axis which, as mentioned before, coincides with that of the predetermined path of movement of the fiber 4. The preform 3 is cylindrical and is also centered on this axis, while the portion 2 from which the fiber 4 is being drawn tapers in the direction toward the fiber 4. The preform 3 is mounted on a support 5 which is only diagrammatically indicated and which is so positioned relative to the torch 1 that the portion 2 of the preform is situated in a heating zone 6 of the torch 1 during the fiber drawing operation. To be able to keep the portion 2 of the preform 3 in the heating zone 6 for the entire duration of the fiber drawing operation as the axial length of the preform 3 diminishes by withdrawal of the material thereof into the fiber 4, the torch 1 and the support 5 are mounted for movement relative to one another in the axial direction of the torch 1 and of the preform 3. The mounting arrangements capable of accomplishing such a mounting as well as the arrangements which control the rate of the relative axial movement between the torch 1 and the support 5 are well known and have not been shown in the drawing.

The torch 1 includes a plurality of tubular members 7, 8, 9 and 10 which consecutively surround one another and which are all centered on the axis of the torch 1 at least at their end portions close to the heating zone 6. The tubular member 7, which is the innermost one, bounds an inner passage 11 through which the fiber 4 is drawn. The next following tubular member 8 in the outward direction bounds with the innermost tubular member 7 a first flow passage 12, which is surrounded by a second flow passage 13 included between the tubular members 8 and 9. Finally the tubular member 9 and the tubular member 10 together define a third or outer flow passage 14.

The torch 1 further includes a plurality of inlet ports or nipples 15, 16 and 17 which respectively communicate with the first, second and third flow passages 12, 13 and 14 at their upstream ends to introduce respective gaseous media thereinto. As indicated in the drawing, the inlet port 15 serves for introducing hydrogen into the first flow passage 12, the inlet port 16 for introducing oxygen into the second flow passage 13, and the inlet port 17 for introducing a shielding gas, especially an inert gas such as argon or nitrogen, into the third flow passage 14.

Figure 2:
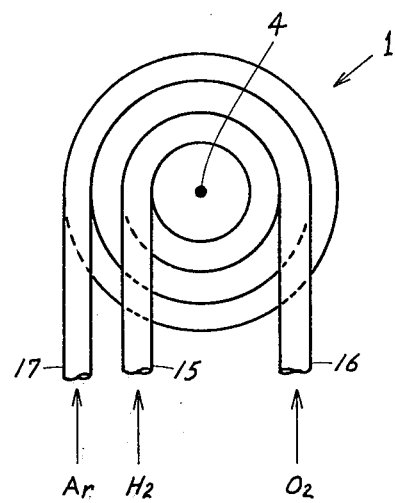
FIG. 2 is a bottom plan view of the torch of FIG. 1.

As shown in FIG. 2, the inlet ports 15, 16 and 17 extend substantially in the tangential directions of the respective flow passages 12, 13 and 14. As a result of this, the respective gaseous medium is introduced into its respective passage 12, 13 or 14 with a substantial component of motion in the circumferential direction and none or only a negligible one in the axial direction of the respective passage 12, 13 or 14. As a result of this tangetial introduction, the respective gaseous medium will be uniformly distributed over the entire cross section of the respective passage 12, 13 or 14 and will flow from the upstream to the downstream portion of the respective passage basically only as a result of the pressure differential between such portions. While the tangential introduction of the gaseous media results in a certain degree of spin of the respective gaseous media about the axis of the torch 1 as such media flow axially toward the heating zone 6, the spinning motion is gradually retarded by friction as the respective media approach the downstream ends of the respective flow passages 12, 13 and 14, so that this spinning motion will not have any deleterious effects at the regions at which they emerge from the flow passages 12, 13 and 14 into the heating zone 6.

As the gaseous media enter the heating zone 6, the oxygen and hydrogen are ignited and form an oxyhydrogen flame 18. As mentioned before, the portion 2 of the preform 3 is situated in the heating zone 6, so that it is exposed to the heating action of the oxyhydrogen flame 18. Since the oxyhydrogen flame 18 has an annular configuration which is coaxial with the preform 3, and since this annular flame 18 is inherently stable, all points of the portion 2 of the preform 3 which are located on the same circumferential line of the portion 2 are exposed to the same temperature of the flame 18 and, consequently, the heat flux into the portion 2 will be the same at all such points, and so will the temperature and the viscosity of the material of the preform 3 at all such points without any need for rotating the preform 3 relative to the torch 1. Hence, all such points will offer the very same resistance to flow during the drawing of the fiber 4 from the portion 2 and the fiber 4 will thus have a circular cross section centered on the axis of the drawing path and of the torch 1. Of course, the drawing speed and/or the rate of axial movement of the support 5 relative to the torch 1 will be so coordinated to the heat flux from the flame 18 into the portion 2 of the preform 3 that the drawing temperature will remain constant during the drawing operation so that the diameter of the fiber 4 will not vary along the length of the fiber 4. This is achieved in a conventional manner which need not be explained here.

The inlet ports 14, 15 and 16 may be distributed or oriented in the manner illustrated in FIG. 2 so that the flow of oxygen will spin in the opposite direction than the flow of hydrogen and the inert gas. This may be advantageous under certain operating conditions, since it will contribute to intimate mixing of hydrogen with oxygen at the region of conflagration. On the other hand, it has been found to be advantageous to so position the inlet ports 14, 15 and 16 that spin in the same direction is imparted to all three gaseous media, so that the possibility of formation of eddy currents at the region of emergence of the oxygen, hydrogen and the inert gas from the respective flow passages 12, 13 and 14 into the heating zone 6, and the attendant possibility of introducing instability into the flame 18, are avoided.

The stream of inert gas serves to shield the oxyhydrogen flame 18 from external influences, such as from ambient air and any currents therein. Shielding of the flame 18 is important in order to assure that no instabilities are introduced into the flame 18 due to environmental factors. This shielding effect is further improved when the outermost tubular element 10 of the torch 1 has an extension 19 which extends beyond the downstream ends of the other three tubular elements 7, 8 and 9 and thus surrounds the heating zone 6. In this construction, the inert gas, while still confining the flame 18, loses much of its shielding function at least at the heating zone 6 where the shielding function with respect to the environment is performed by the extension 19. Yet, by confining the flame 18, the inert gas shields the extension 19 from direct contact with the flame 18 and thus from overheating. Moreover, the inert gas serves as a cooling medium not only for the extension 19, but also for the remainder of the outermost tubular element 10 and the inwardly adjacent tubular element 9 of the torch 1.

The diameters of the tubular elements 7, 8, 9 and 10 and thus the cross-sectional flow-through areas of the passages 12, 13 and 14, the rates of admission of the various media through the respective inlet ports 15, 16 and 17 into the respective passages 12, 13 and 14 and the pressures of such gaseous media are so selected as to obtain the proper hydrogen/oxygen ratio in the heating zone 6 for sustaining the flame 18 and the speed of flow of the inert gas past the heating zone 6 which is needed for confining the flame 18 and for cooling the extension 19 of the outermost tubular element 10.

Successful tests were performed using the following parameters: the innermost tubular element 7: outer diameter 17 mm and wall thickness 1 mm; the next outwardly following tubular element 8: outer diameter 23 mm and wall thickness 1.5 mm; the next outwardly following tubular element 9: outer diameter 29 mm and wall thickness 1.5 mm; the outermost tubular element 10: outer diameter 35 mm and wall thickness 1.5 mm; and the inlet ports 15, 16 and 17: outer diameters 6 mm and wall thicknesses 1.0 mm. The respective parameters of the gaseous media admitted through the inlet ports 15, 16 and 17: oxygen: 3.2 l/min at 20 p.s.i.; hydrogen: 11.0 l/min at 20 p.s.i.; and nitrogen: 10.7 l/min at 35 p.s.i. The optical fiber 4 drawn during these tests was of high quality, that is, it had a high strength and a constant circular cross section over its entire length despite the fact that no rotation existed between the torch 1 and the preform 3 during the drawing operation.

The tubular elements 7, 8, 9 and 10 used in these tests were made of fused quartz which was internally grown in precision-bore tubular substrates.

While I have described above the principles of my invention in connection with specific apparatus, it is to be clearly understood that this description is made only by way of example and not as a limitation to the scope of my invention as set forth in the accompanying claims.

I claim:

1. An oxyhydrogen flame torch arrangement for use in heating a portion of a preform and for drawing an optical fiber in a predetermined path from the heated portion of the preform, comprising
    means for defining an internal passage and at least two annular additional passages extending along and centered on the path, one of said additional passages completely circumferentially surrounding the other which, in turn, surrounds said internal passage, each of said passages having an upstream portion, and a downstream portion which opens into a heating zone receiving the portion of the preform to be heated during the operation of the torch,
    means for introducing oxygen and hydrogen into said upstream portion respectively of a first and of a second of said additional passages for flow along said path toward and beyond the respective downstream portion and for mixing with one another and combustion in the form of an annular flame in said heating zone, and means for drawing the optical fiber in said path through said internal passage.

2. The oxyhydrogen flame torch as defined in claim 1, wherein said defining means further bounds an external passage surrounding said one passage; and further comprising means for introducing a shielding gas into said external passage for flow through the latter toward and past said heating zone.

3. The oxyhydrogen flame torch as defined in claim 2, wherein said defining means includes four tubular members coaxially consecutively surrounding one another.

4. The oxyhydrogen flame torch as defined in claim 3, wherein said tubular members are of fused quartz.

5. The oxyhydrogen flame torch as defined in claim 3, wherein the inner three of said tubular members terminate at said heating zone while the outer of said tubular members extends beyond said inner tubular members in the downstream direction so as to surround at least a part of said heating zone.

6. The oxyhydrogen flame torch as defined in claim 5, wherein said outer tubular member extends beyond said heating zone.

7. A method of making an optical fiber from a preform, comprising the steps of
conducting oxygen and hydrogen in separate annular flow paths respectively coaxially surrounding one another and an internal passage along the latter to a heating zone which receives a portion of the preform from which the optical fiber is to be drawn, and
intimately mixing and combusting the oxygen and hydrogen with one another in the heating zone in the form of an annular flame to heat said portion of the preform, and
means for drawing the optical fiber from said portion of the preform substantially centrally of said annular flame and through said internal passage.

8. The method as defined in claim 7, and further comprising the step of externally shielding said flame.

9. The method as defined in claim 8, wherein said shielding step includes causing inert gas to flow in an annular flow path through said heating zone around said flame.

* * * * *